(12) United States Patent
Rajkotia

(10) Patent No.: US 7,313,112 B2
(45) Date of Patent: Dec. 25, 2007

(54) APPARATUS AND METHOD FOR INTERWORKING CDMA2000 NETWORKS AND WIRELESS LOCAL AREA NETWORKS

(75) Inventor: Purva R. Rajkotia, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 907 days.

(21) Appl. No.: 10/741,946

(22) Filed: Dec. 19, 2003

(65) Prior Publication Data

US 2005/0147068 A1    Jul. 7, 2005

(51) Int. Cl.
*H04Q 7/00* (2006.01)
*H04Q 7/20* (2006.01)

(52) U.S. Cl. .................... 370/331; 455/439; 455/443

(58) Field of Classification Search ............... None
See application file for complete search history.

(56) References Cited

U.S. PATENT DOCUMENTS

2004/0008645 A1*    1/2004    Janevski et al. ............ 370/331

* cited by examiner

*Primary Examiner*—Ronald Abelson

(57) ABSTRACT

A method of communicating with mobile stations operating in an area covered by a wide-area wireless network and a wireless local area network (WLAN). The method comprises the steps of: i) receiving in a packet data server node of the wide-area wireless network data traffic statistics associated with each of a plurality of base stations associated with the wide-area wireless network; ii) receiving in the packet data server node of the wide-area wireless network data traffic statistics associated with each of a plurality of access points associated with the WLAN; iii) identifying a first base station handling a high level of data traffic; and iv) transmitting a handoff direction message to a first mobile station communicating with the first base station, the handoff direction message capable of causing the first mobile station to access a selected first access point of the WLAN.

20 Claims, 2 Drawing Sheets

APPARATUS AND METHOD FOR INTERWORKING CDMA2000 NETWORKS AND WIRELESS LOCAL AREA NETWORKS

TECHNICAL FIELD OF THE INVENTION

The present invention generally relates to wireless networks and, more specifically, to methods and apparatuses for interworking CDMA2000 wireless networks and wireless local area networks (WLANs).

BACKGROUND OF THE INVENTION

Businesses and consumers use a wide variety of fixed and mobile wireless terminals, including cell phones, pagers, Personal Communication Services (PCS) systems, and fixed wireless access devices (i.e., vending machine with cellular capability). Wireless service providers continually try to create new markets for wireless devices and expand existing markets by making wireless devices and services cheaper and more reliable. The price of wireless devices has decreased to the point where these devices are affordable to nearly everyone.

A conventional public wide area network (WAN), such as a CDMA cellular network, covers a large geographical area (on the order of 1 to 100 plus square miles), but has a relatively low bit-rate between each mobile station and each base station. These public wireless networks use regulated portions of the radio spectrum and are shared by many users. The infrastructure costs of public wireless networks are relatively high due to the size and complexity of the base station equipment.

Newer wireless networks, such as CDMA2000-EV-DO/DV networks, offer higher bit-rates (on the order to 2.4 MBps) and enhanced data services, such as web browsing. These networks pack many users into a relatively small portion of the regulated spectrum. Other types of radio networks, such as wireless local area networks (WLANs), try to improve spectral efficiency and to increase bit-rates by using unregulated frequencies and smaller coverage areas. For example, an IEEE 802.xx wireless LAN (i.e., a WI-FI network) may transmit at speeds up to 11 MBps in Direct Sequence Spread Spectrum (DSSS) mode or at speeds up to 54 MBps in Orthogonal Frequency Division Multiplexing (OFDM) mode.

An access point (or base station) in an IEEE 802.xx (e.g., IEEE 802.11) network may cover an area only a few hundred feet in diameter. Each access point is connected to the core network (e.g., Internet). In order to cover the same geographical area as a base station of a public wireless network, a large number of IEEE 802.xx network access points and a large wireline back haul network are required. Thus, there are always tradeoffs between and among the coverage areas, the maximum bit-rates, and the costs of different types of wireless networks.

In order to reduce the number of wireless devices a consumer must carry, equipment vendors have developed dual mode transceivers that allow a user to access both public wireless (e.g., CDMA2000) networks and wireless LANs. However, the usefulness of these devices because it is not technically feasible to perform reliably a seamless handoff between a CDMA2000 network and a wireless LAN. Thus, if a user is mobile, the user may repeatedly drop data sessions with one type of network and be forced to search for and access another type of network.

Also, there is no control mechanism that can efficiently distribute traffic loads between CDMA2000 networks and wireless LANs. A user in a CDMA2000 wireless network may have difficulty browsing websites and receiving e-mail during peak traffic conditions. At the same time, the user could easily access a lightly loaded 802.11 wireless LAN. There currently is no mechanism that can cause the user's mobile station to automatically handoff from the busy CDMA2000 wireless network to the underutilized 802.11 wireless LAN.

Therefore, there is a need in the art for an improved wireless network architecture that overcomes the limitations of the above-described conventional wireless networks. In particular, there is a need for a system and method that provides a handoff capability between CDMA2000 networks and wireless LANs. More particularly, there is a need for a wireless network architecture that uses this handoff capability to distribute data traffic between CDMA2000 networks and wireless LANs.

SUMMARY OF THE INVENTION

The present invention provides a system and method for performing a reliable hard handoff between a CDMA2000 wireless network and a wireless local area network (WLAN), such as an 802.11 (i.e., WiFi) network. The present invention also performs an effective load balancing between the CDMA2000 network and the WiFi network. These objectives are achieved by modifying the air interface messages, the wired network messages, and some network functions.

To address the above-discussed deficiencies of the prior art, it is a primary object of the present invention to provide a method of communicating with mobile stations operating in an area covered by a wide-area wireless network and a wireless local area network (WLAN). According to an advantageous embodiment of the present invention, the method comprises the steps of: i) receiving in a packet data server node of the wide-area wireless network data traffic statistics associated with each of a plurality of base stations associated with the wide-area wireless network; ii) receiving in the packet data server node of the wide-area wireless network data traffic statistics associated with each of a plurality of access points associated with the WLAN; iii) identifying a first base station handling a high level of data traffic; and iv) transmitting a handoff direction message to a first mobile station communicating with the first base station, the handoff direction message capable of causing the first mobile station to access a selected first access point of the WLAN.

According to one embodiment of the present invention, the handoff direction message comprises signal parameters associated with the forward and reverse channels of the WLAN.

According to another embodiment of the present invention, the method further comprises the step of transmitting a request message to the first mobile station, the request message capable of causing the first mobile station to transmit to the first base station a list of access points of the WLAN from which the first mobile station receives signals.

According to still another embodiment of the present invention, the method further comprises the step of selecting the selected first access point of the WLAN from the list of access points of the WLAN from which the first mobile station receives signals.

According to yet another embodiment of the present invention, the wide-area wireless network is a CDMA2000 wireless network.

According to further embodiment of the present invention, the handoff direction message is a Universal Handoff Direction message.

According to a still further embodiment of the present invention, the request message transmitted to the first mobile station is a Pilot Signal Measurement message.

According to a yet further embodiment of the present invention, the WLAN is an IEEE-802.xx-compatible wireless local area network.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

Figure 1:
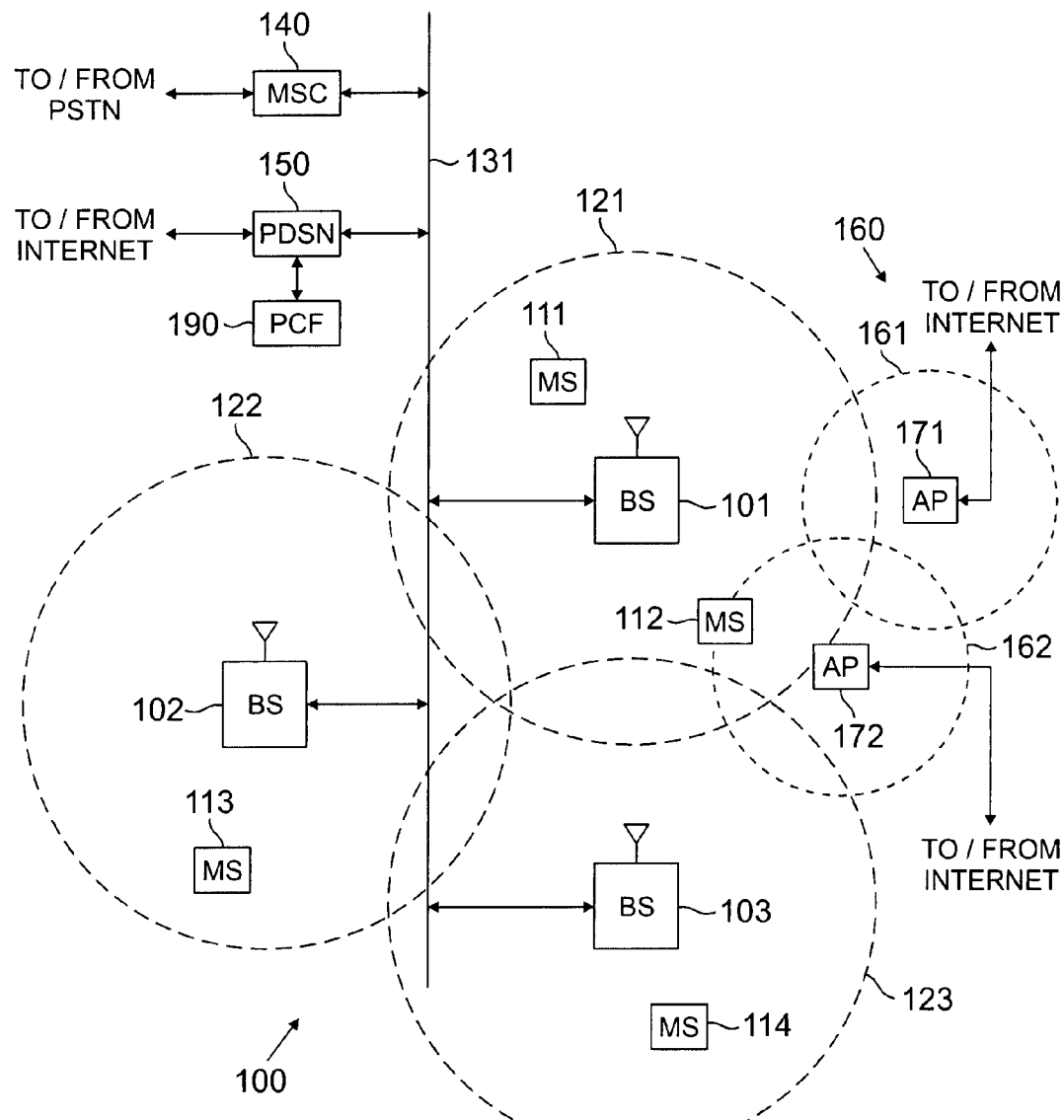
FIG. 1 illustrates an exemplary CDMA2000 wireless network and an exemplary wireless local area network (WLAN) that are capable of handing off mobile stations in both directions according to the principles of the present invention.
Figure 2:
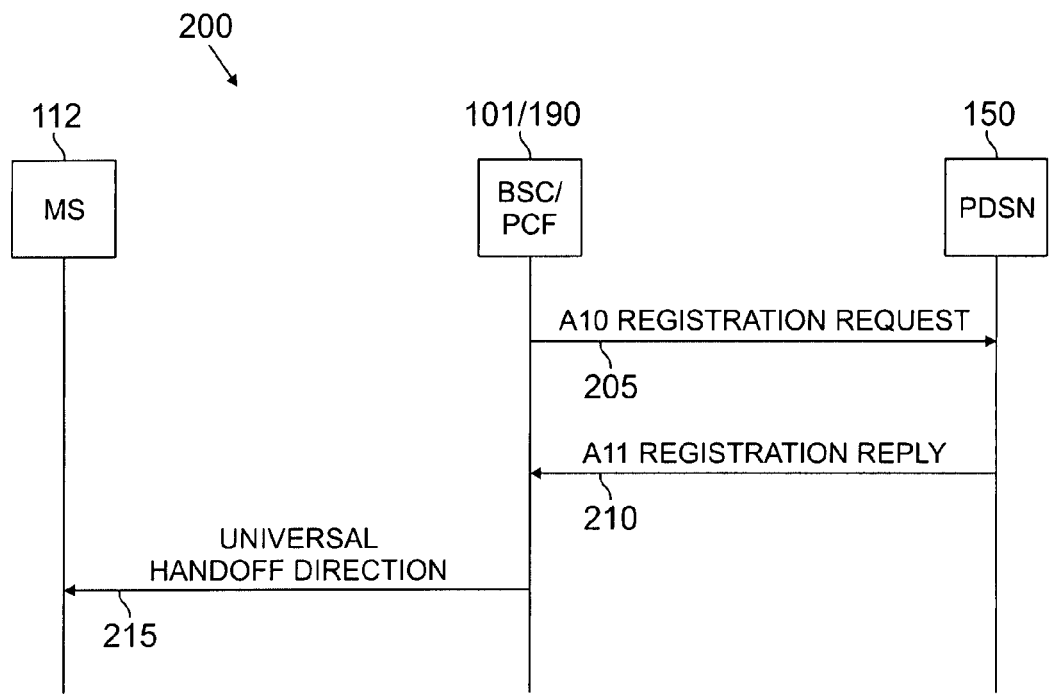
FIG. 2 is a message flow diagram illustrating selected control messages in the exemplary CDMA2000 wireless network in FIG. 1 according to an exemplary embodiment of the present invention.
Figure 3:
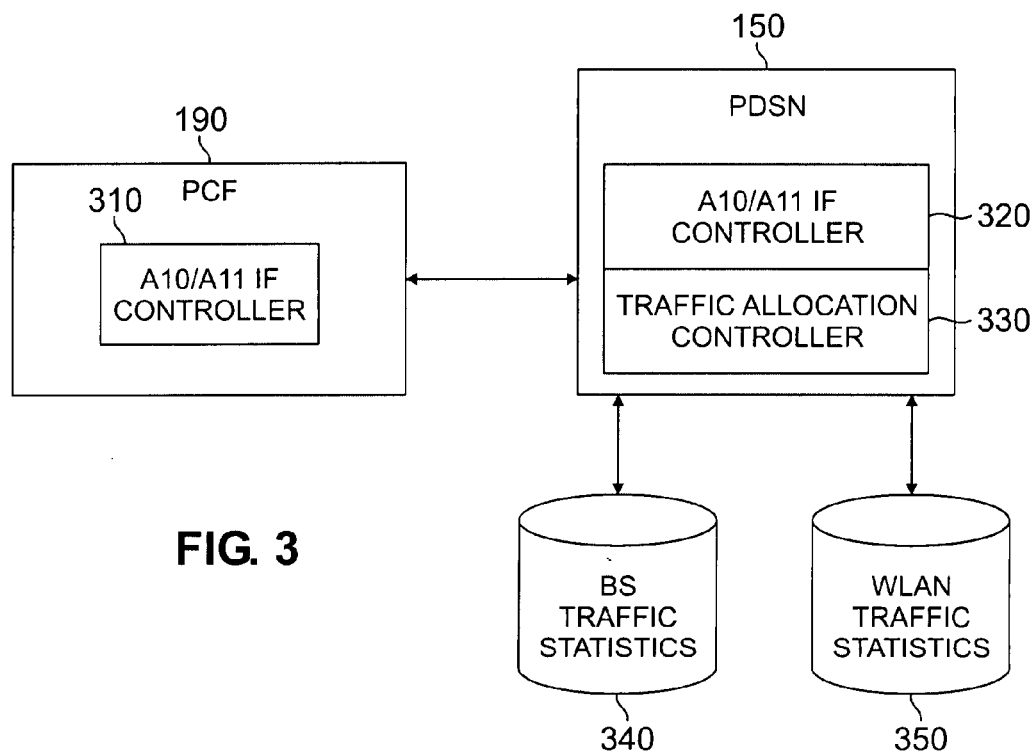
FIG. 3 illustrates selected portions of the CDMA2000 wireless network in greater detail according to the principles of the present invention.

FIGS. 1 through 3, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged wireless network.

FIG. 1 illustrates exemplary CDMA2000 wireless network 100 and exemplary wireless local area network (WLAN) 160, which are capable of handing off mobile stations 111-114 in both directions according to the principles of the present invention. Mobile stations 111-114 may be any suitable wireless devices, including conventional cellular radiotelephones, PCS handset devices, personal digital assistants, portable computers, telemetry devices, and the like, which are capable of communicating with the base stations and access points via wireless links. According to the exemplary embodiment, mobile stations 111-114 operate in two or more modes that enable mobile stations 111-114 to access both CDMA2000 wireless network 100 and wireless local area network (LAN) 160.

Wireless network 100 comprises a plurality of cell sites 121-123, each of which contains one of the base stations, BS 101, BS 102, or BS 103. Wireless local area network (WLAN) 160 comprises a plurality of cell sites 161 and 162, each of which contains a base station or access point (AP), such as AP 171 and AP 172. Base stations 101-103 are capable of communicating with mobile stations (MS) 111-114 over code division multiple access (CDMA) channels according to the IS-2000-C standard (i.e., Release C of CDMA2000). Access points 171 and 172 are capable of communicating with one or more of mobile stations (MS) 111-114 using Direct Sequence Spread Spectrum (DSSS) techniques or Orthogonal Frequency Division Multiplexing (OFDM) techniques.

The present invention is not limited to mobile devices. Other types of wireless access terminals, including fixed wireless terminals, may be used. For the sake of simplicity, only mobile stations are shown and discussed hereafter. However, it should be understood that the use of the term "mobile station" in the claims and in the description below is intended to encompass both truly mobile devices (e.g., cell phones, wireless laptops) and stationary wireless terminals (e.g., monitoring devices with wireless capability).

Dotted lines show the approximate boundaries of the cell sites 121-123 and 161-162 in which base stations 101-103 and access points 171-172 are located. The cell sites are shown approximately circular for the purposes of illustration and explanation only. It should be clearly understood that the cell sites may have other irregular shapes, depending on the cell configuration selected and natural and man-made obstructions.

As is well known in the art, cell sites 121-123 are comprised of a plurality of sectors (not shown), where a directional antenna coupled to the base station illuminates each sector. The embodiment of FIG. 1 illustrates the base station in the center of the cell. Alternate embodiments position the directional antennas in corners of the sectors. The system of the present invention is not limited to any particular cell site configuration.

In one embodiment of the present invention, BS 101, BS 102, and BS 103 comprise a base station controller (BSC) and at least one base transceiver subsystem (BTS). Base station controllers and base transceiver subsystems are well known to those skilled in the art. A base station controller is a device that manages wireless communications resources, including the base transceiver subsystems, for specified cells within a wireless communications network. A base transceiver subsystem comprises the RF transceivers, antennas, and other electrical equipment located in each cell site. This equipment may include air conditioning units, heating units, electrical supplies, telephone line interfaces and RF transmitters and RF receivers. For the purpose of simplicity and clarity in explaining the operation of the present invention, the base transceiver subsystem in each of cells 121, 122, and 123 and the base station controller associated with each base transceiver subsystem are collectively represented by BS 101, BS 102 and BS 103, respectively.

BS 101, BS 102 and BS 103 transfer voice and data signals between each other and the public switched telephone network (PSTN) (not shown) via communication line 131 and mobile switching center (MSC) 140. BS 101, BS 102 and BS 103 also transfer data signals, such as packet data, with the Internet (not shown) via communication line 131 and packet data server node (PDSN) 150. Packet control function (PCF) unit 190 controls the flow of data packets between base stations 101-103 and PDSN 150. PCF unit 190 may be implemented as part of PDSN 150, as part of base stations 101-103, or as a stand-alone device that communicates with PDSN 150, as shown in FIG. 1. Line 131 also provides the connection path to transfer control signals between MSC 140 and BS 101, BS 102 and BS 103 used to establish connections for voice and data circuits between MSC 140 and BS 101, BS 102 and BS 103.

Communication line 131 may be any suitable connection means, including a T1 line, a T3 line, a fiber optic link, or any other type of data connection. The connections on line 131 may transmit analog voice signals or digital voice signals in pulse code modulated (PCM) format, Internet Protocol (IP) format, asynchronous transfer mode (ATM) format, or the like. According to an advantageous embodiment of the present invention, line 131 also provides an Internet Protocol (IP) connection that transfers data packets between the base stations of wireless network 100, including BS 101, BS 102 and BS 103. Thus, line 131 comprises a local area network (LAN) that provides direct IP connections between base stations without using PDSN 150.

AP 171 and AP 172 transfer voice and data signals to and from an Internet protocol (IP) network, such as the Internet. The ability to access the Internet enables AP 171 and AP 172 to communicate with PDSN 150 and wireless network 100. Because of this ability, it is possible to perform handoffs and to load share data traffic between wireless network 100 and WLAN 160.

MSC 140 is a switching device that provides services and coordination between the subscribers in a wireless network and external networks, such as the PSTN or Internet. MSC 140 is well known to those skilled in the art. In some embodiments of the present invention, communications line 131 may be several different data links where each data link couples one of BS 101, BS 102, or BS 103 to MSC 140.

The present disclosure allows handoffs to be performed between a WiFi network (e.g., WLAN 160) and a public cellular wireless network (e.g., CDMA2000 wireless network 100). To achieve this air interface messages between base station 101-103 and mobile stations 111-114 must be modified. Also, network control messages and some of the network functions of wireless network 100 have been modified.

There are three possible types of handoffs in a geographical area in which a number of between CDMA2000 wireless networks and a number of wireless LANs are operating. One type of handoff operation is a handoff between CDMA2000 networks. This type of handoff is performed using conventional techniques and is not affected by the present invention. A second type of handoff is a handoff between wireless LANs. This type of handoff also is performed using conventional techniques and is not affected by the present invention. The third type of handoff is a handoff between a WLAN and a CDMA2000 network. This type of handoff is performed according to the principals of the present invention.

For the purposes of the present invention, it is assumed that mobile stations 111-114 have the capability to switch between the Wi-Fi network and the CDMA2000 network. It also is assumed that there is a loose coupling between WLAN 160 and CDMA2000 network 100. The access gateways (e.g., PDSN 150) are the point of coupling between WLAN 160 and wireless network 100.

According to one example, MS 112 is operating in CDMA2000 network 100 in cell site 121. Cell sites 161 and 162 overlap cell site 121. Both wireless LAN 160 and CDMA2000 network 100 are coupled to PDSN 150. MS 112 is currently communicating with BS 101. PDSN 150 monitors the RF link for BSC of BS 101 and the output of WLAN 160. If WLAN 160 is lightly loaded and CDMA2000 network 100 is becoming heavily loaded, PDSN 150 sends a notification message to BS 101 to trigger a handoff to WLAN 160. WLAN 160 operates in a different frequency band than wireless network 100. Hence the handoff will be hard handoff. The handoff can be performed even if MS 112 determines that the RF link to BS 101 to be of good signal strength. This, the present invention discloses a forced hard handoff scheme.

FIG. 2 depicts message flow diagram 200, which illustrates selected control messages in exemplary CDMA2000 wireless network according to an exemplary embodiment of the present invention. In FIG. 2, it is assumed that PCF unit 190 functionality is integrated into the base station controller (BSC) portion of BS 101. The present invention may be implemented by adding new Throughput Request data field to A10 Registration Request message 205, which is transmitted from BSC/PCF 101/190 to PDSN 150. The present invention also adds a new Throughput Response data field to A11 Registration Reply message 210, which is transmitted from PDSN 150 to BSC/PCF 101/190. Finally, the present invention adds new signal parameter information related to the access points of WLAN 160 to the Universal Handoff Direction message 215 transmitted from BSC/PDF 101/190 to MS 112.

FIG. 3 illustrates selected portions of wireless network 100 in greater detail according to the principles of the present invention. Packet control function (PCF) unit 190 comprises A10/A11 interface (IF) controller 310 and packet data server node (PDSN) 150 comprises A10/A11 Interface (IF) controller 320 and traffic allocation controller 330. Modifications to the control message interfaces of A10/A11 IF controller 310 and A10/A11 IF controller 320 enable handoffs and traffic load sharing between wireless network 100 and WLAN 160. Traffic allocation controller 330 determines and controls the distribution of data traffic between wireless network 100 and WLAN 160 and triggers the forced handoffs that implement the traffic distribution.

According to an exemplary embodiment of the present invention, PDSN 150 is capable of accessing a database that tracks the total traffic demand on each base station (BS) in wireless network 100. This database is represented by BS traffic statistics database 340. BS traffic statistics database 340 may be directly coupled to or integrated into PDSN 150. Alternatively, PDSN 150 may access remotely disposed BS traffic statistics database 340 via the Internet.

Similarly, PDSN 150 is capable of accessing a database that tracks the total traffic demand on each access point (AP) in wireless LAN 160. This database is represented by WLAN traffic statistics database 350. WLAN traffic statistics database 350 may be directly coupled to or integrated into PDSN 150. Alternatively, PDSN 150 may access remotely disposed WLAN traffic statistics database 350 via the Internet.

According to the principles of the present invention, BS 101 and PDSN 150 are provisioned with the signal parameters of the forward and reverse channels of WLAN 160

(e.g., frequency, transmit power, etc.). These parameters may be provisioned by storing them in database 350, for example. UHDM 215 is modified to include the parameters required for the handoff to be performed to WLAN 160. Alternatively, a different handoff message or an entirely new handoff message may be used to transmit the WLAN 160 signal parameter information to MS 112.

PDSN 150 monitors all access points and base stations to determine the throughput of each base station and access point. The throughput information is queried using A10 Registration Request message 205. PDSN 150 responds to A10 Registration Request by transmitting A11 Registration Reply message 210. BSC/PCF 101/190 is now aware of the throughput or bandwidth allocated to it. If the throughput is large, that means a large amount of data has been requested from BSC/PCF 101/190 and PDSN 150. If the throughput exceeds a predetermined limit, BS 101 requests MS 112 to send a Pilot Strength Measurement message (PSMM).

If the PSMM values sent by MS 112 indicate that MS 112 also receives a strong signal from a particular access point of WLAN 160, the BSC portion of BS 101 may initiate a forced handoff that forces MS 112 to access that particular access point. To accomplish this, BSC/PDF 101/190 sends UHDM 215 to MS 112. UHDM contains the signal parameters of, for example, AP 172 in WLAN 160 as the target access point to which MS 112 will be handed off. After receiving UHDM 215, MS 112 performs a hard handoff and moves on to WLAN 160.

For handoffs between WLAN 160 and CDMA2000 network 100, WLAN 160 is notified about the throughput (data traffic) being used. WLAN 160 then determines if the throughput level exceeds a predetermined limit. If predetermined limit is exceeded, WLAN 160 transmits a notification message to MS 112 causing MS 112 to search for CDMA2000 wireless network 100 and to perform a handoff to CDMA2000 wireless network 100.

The present invention ensures that the user of MS 112 always gets the best available throughput by ensuring that mobile stations 111-114 are properly shared between WLAN 160 and CDMA2000 wireless network 100. Advantageously, users get higher data rates and the service providers can handle more users.

Although the present invention has been described with an exemplary embodiment, various changes and modifications may be suggested to one skilled in the art. It is intended that the present invention encompass such changes and modifications as fall within the scope of the appended claims.

What is claimed is:

1. A method of communicating with mobile stations operating in an area covered by a wide-area wireless network and a wireless local area network (WLAN), the method comprising:
   receiving in a packet data server node of the wide-area wireless network data traffic statistics associated with each of a plurality of base stations associated with the wide-area wireless network;
   receiving in the packet data server node of the wide-area wireless network data traffic statistics associated with each of a plurality of access points associated with the WLAN;
   identifying a first base station handling a high level of data traffic; and
   transmitting a handoff direction message to a first mobile station communicating with the first base station, wherein the handoff direction message causes the first mobile station to access a selected first access point of the WLAN.

2. The method as set forth in claim 1 wherein the handoff direction message comprises signal parameters associated with the forward and reverse channels of the WLAN.

3. The method as set forth in claim 2 further comprising: transmitting a request message to the first mobile station, wherein the request message causes the first mobile station to transmit to the first base station a list of access points of the WLAN from which the first mobile station receives signals.

4. The method as set forth in claim 3 further comprising: selecting the selected first access point of the WLAN from the list of access points of the WLAN from which the first mobile station receives signals.

5. The method as set forth in claim 4 wherein the wide-area wireless network is a CDMA 2000 wireless network.

6. The method as set forth in claim 5 wherein the handoff direction message is a Universal Handoff Direction message.

7. The method as set forth in claim 5 wherein the request message transmitted to the first mobile station is a Pilot Signal Measurement message.

8. The method as set forth in claim 4 wherein the WLAN is an IEEE-802.11-compatible wireless local area network.

9. A wide-area wireless network comprising:
   a plurality of base stations to communicate with a plurality of mobile stations in a coverage area of said wide-area wireless network, wherein said mobile stations communicate with a wireless local area network (WLAN) disposed in said coverage area of said wide-area wireless network; and
   a packet data server node to receive data traffic statistics associated with each of said base stations associated with said wide-area wireless network and to receive data traffic statistics associated with each of a plurality of access points associated with said WLAN,
   wherein said packet data server node identifies a first base station handling a high level of data traffic and, in response to said identification, transmits a handoff direction message to a first mobile station communicating with said first base station, and
   wherein said handoff direction message causes said first mobile station to access a selected first access point of said WLAN.

10. The wide-area wireless network as set forth in claim 9 wherein said handoff direction message comprises signal parameters associated with forward and reverse channels of said WLAN.

11. The wide-area wireless network as set forth in claim 10 wherein said packet data server node causes said first base station to transmit a request message to said first mobile station, and
   wherein said request message causes said first mobile station to transmit to said first base station a list of access points of said WLAN from which said first mobile station receives signals.

12. The wide-area wireless network as set forth in claim 11 wherein said packet data server node selects said selected first access point of said WLAN from said list of access points of said WLAN from which said first mobile station receives signals.

13. The wide-area wireless network as set forth in claim 12 wherein said wide-area wireless network is a CDMA2000 wireless network.

14. The wide-area wireless network as set forth in claim 13 wherein said handoff direction message is a Universal Handoff Direction message.

15. The wide-area wireless network as set forth in claim 13 wherein said request message transmitted to said first mobile station is a Pilot Signal Measurement message.

16. The wide-area wireless network as set forth in claim 12 wherein said WLAN is an IEEE-802.11-compatible wireless local area network.

17. A packet data server for use in a wide-area wireless network comprising a base stations that communicate with mobile stations in a coverage area of said wide-area wireless network,
  wherein said mobile stations communicate with a wireless local area network (WLAN) disposed in said coverage area of said wide-area wireless network,
  wherein the packet data server node receives i) data traffic statistics associated with each of said base stations associated with said wide-area wireless network and ii) data traffic statistics associated with each of a plurality of access points associated with said WLAN,
  wherein said packet data server node identifies a first base station handling a high level of data traffic and, in response to said identification, transmits a handoff direction message to a first mobile station communicating with said first base station, and
  wherein said handoff direction message causes said first mobile station to access a selected first access point of said WLAN.

18. The packet data server node as set forth in claim 17 wherein said handoff direction message comprises signal parameters associated with forward and reverse channels of said WLAN.

19. The packet data server node as set forth in claim 18 wherein said packet data server node causes said first base station to transmit a request message to said first mobile station, and
  wherein said request message causes said first mobile station to transmit to said first base station a list of access points of said WLAN from which said first mobile station receives signals.

20. The packet data server node as set forth in claim 19 wherein said packet data server node selects said selected first access point of said WLAN from said list of access points of said WLAN from which said first mobile station receives signals.

* * * * *